(12) United States Patent
Miller et al.

(10) Patent No.: US 11,391,298 B2
(45) Date of Patent: Jul. 19, 2022

(54) ENGINE HAVING VARIABLE PITCH OUTLET GUIDE VANES

(71) Applicant: General Electric Company, Schenectady, NY (US)

(72) Inventors: Brandon Wayne Miller, Liberty Township, OH (US); Thomas Lee Becker, Jr., Symmes Township, OH (US)

(73) Assignee: General Electric Company, Schenectady, NY (US)

( * ) Notice: Subject to any disclaimer, the term of this patent is extended or adjusted under 35 U.S.C. 154(b) by 838 days.

(21) Appl. No.: 14/877,210

(22) Filed: Oct. 7, 2015

(65) Prior Publication Data

US 2017/0102006 A1 Apr. 13, 2017

(51) Int. Cl.
*F04D 29/56* (2006.01)
*F01D 17/16* (2006.01)
(Continued)

(52) U.S. Cl.
CPC .............. *F04D 29/563* (2013.01); *F01D 9/02* (2013.01); *F01D 17/162* (2013.01); *F02C 7/20* (2013.01);
(Continued)

(58) Field of Classification Search
CPC ........ F04D 29/56; F04D 29/563; F04D 29/54; F04D 29/541; F04D 29/542;
(Continued)

(56) References Cited

U.S. PATENT DOCUMENTS

| 2,999,630 A | 9/1961 | Warren et al. |
| 3,318,574 A * | 5/1967 | Tyler ....................... F01D 17/16 415/36 |

(Continued)

FOREIGN PATENT DOCUMENTS

| CN | 1204005 A | 1/1999 |
| CN | 1975130 A | 6/2007 |

(Continued)

OTHER PUBLICATIONS

U.S. Appl. No. 14/771,975, filed Sep. 1, 2015, Stringfellow et al.
(Continued)

*Primary Examiner* — David E Sosnowski
*Assistant Examiner* — Wayne A Lambert
(74) *Attorney, Agent, or Firm* — Dority & Manning, P.A.

(57) ABSTRACT

An aeronautical propulsion device including a fan and a plurality of variable guide vanes is provided. The fan includes a plurality of fan blades for providing a flow of air and the plurality of variable guide vanes are configured for directing air to or from the fan in a desired direction. Each of the plurality of guide vanes defines an inner end along the radial direction and is attached to a housing of the portion device at the inner end in a rotatable manner. The propulsion device further includes a pitch change mechanism positioned in the housing and mechanically coupled to at least one of the plurality of guide vanes for changing a pitch of the at least one of the plurality of guide vanes.

21 Claims, 3 Drawing Sheets

(51) Int. Cl.
*F01D 9/02* (2006.01)
*F02C 7/20* (2006.01)
*F02C 9/54* (2006.01)
*F02K 3/06* (2006.01)
*F04D 29/32* (2006.01)
*F04D 29/52* (2006.01)
*F04D 29/54* (2006.01)

(52) U.S. Cl.
CPC ............. *F02C 9/54* (2013.01); *F02K 3/06* (2013.01); *F04D 29/325* (2013.01); *F04D 29/522* (2013.01); *F04D 29/542* (2013.01); *F05D 2220/323* (2013.01); *F05D 2220/36* (2013.01); *F05D 2240/12* (2013.01); *F05D 2240/50* (2013.01); *F05D 2260/4031* (2013.01); *F05D 2260/53* (2013.01)

(58) Field of Classification Search
CPC .... F04D 29/522; F04D 27/002; F01D 17/162; F01D 17/14; F01D 17/141; F01D 17/16; F01D 9/02; F05D 2220/36; F05D 2220/323; F05D 2240/12; F05D 2240/50; F05D 2260/4031; F05D 2260/53; F02K 3/06; F02K 3/062; F02K 3/065; F02C 7/20; F02C 9/54; B64D 27/16; B64D 27/26
See application file for complete search history.

(56) References Cited

U.S. PATENT DOCUMENTS

| | | | | |
|---|---|---|---|---|
| 3,352,537 A * | 11/1967 | Petrie | ........... | F01D 17/162 60/39.01 |
| 3,542,484 A * | 11/1970 | Mason | ........... | F01D 17/162 415/147 |
| 3,638,428 A * | 2/1972 | Shipley | ........... | F02K 3/075 60/226.1 |
| 3,687,569 A * | 8/1972 | Klompas | ........... | F01D 7/00 415/140 |
| 3,861,822 A * | 1/1975 | Wanger | ........... | F01D 17/162 415/147 |
| 3,870,434 A * | 3/1975 | Paulson | ........... | F01D 7/00 416/160 |
| 3,876,334 A * | 4/1975 | Andrews | ........... | F04D 29/36 416/160 |
| 3,887,297 A * | 6/1975 | Welchek | ........... | F01D 17/162 415/148 |
| 4,222,234 A * | 9/1980 | Adamson | ........... | B64C 29/0066 244/23 D |
| 4,239,450 A * | 12/1980 | Geitner | ........... | F04D 29/46 415/160 |
| 4,275,560 A * | 6/1981 | Wright | ........... | F02K 3/075 60/226.3 |
| 4,278,398 A * | 7/1981 | Hull | ........... | F01D 17/162 415/160 |
| 4,292,802 A * | 10/1981 | Snow | ........... | F02K 3/075 60/204 |
| 4,363,600 A * | 12/1982 | Thebert | ........... | F01D 17/162 415/140 |
| 4,371,133 A * | 2/1983 | Edgley | ........... | B64C 11/001 244/13 |
| 4,430,043 A * | 2/1984 | Knight | ........... | F04D 29/563 415/149.4 |
| 4,486,146 A | 12/1984 | Campion | | |
| 4,569,199 A | 2/1986 | Klees et al. | | |
| 4,607,657 A | 8/1986 | Hirschkron | | |
| 4,652,208 A * | 3/1987 | Tameo | ........... | F01D 5/146 415/148 |
| 4,657,484 A * | 4/1987 | Wakeman | ........... | B64C 11/306 415/130 |
| 4,784,575 A | 11/1988 | Nelson et al. | | |
| 4,791,783 A * | 12/1988 | Neitzel | ........... | F01D 17/162 60/226.3 |
| 4,796,424 A * | 1/1989 | Farrar | ........... | F02C 7/04 244/69 |
| 4,907,946 A | 3/1990 | Ciokajlo et al. | | |
| 4,927,329 A * | 5/1990 | Kliman | ........... | F01D 7/00 416/127 |
| 4,936,748 A * | 6/1990 | Adamson | ........... | F02K 3/072 416/123 |
| 5,054,998 A | 10/1991 | Davenport | | |
| 5,155,993 A * | 10/1992 | Baughman | ........... | F04D 27/023 60/226.1 |
| 5,190,441 A | 3/1993 | Murphy et al. | | |
| 5,199,850 A * | 4/1993 | Carvalho | ........... | F01D 7/00 416/153 |
| 5,215,434 A * | 6/1993 | Greune | ........... | F01D 17/162 415/150 |
| 5,259,187 A | 11/1993 | Dunbar et al. | | |
| 5,261,227 A * | 11/1993 | Giffin, III | ........... | F01D 17/162 60/226.1 |
| 5,281,087 A * | 1/1994 | Hines | ........... | F01D 17/162 415/160 |
| 5,345,760 A | 9/1994 | Giffin, III | | |
| 5,457,346 A | 10/1995 | Blumberg et al. | | |
| 5,601,401 A * | 2/1997 | Matheny | ........... | F01D 17/162 415/160 |
| 5,630,701 A * | 5/1997 | Lawer | ........... | F01D 17/162 415/160 |
| 5,794,432 A * | 8/1998 | Dunbar | ........... | F01D 17/162 60/204 |
| 5,950,308 A | 9/1999 | Koff et al. | | |
| 6,547,518 B1 | 4/2003 | Czachor et al. | | |
| 6,602,049 B2 * | 8/2003 | Caubet | ........... | F01D 5/143 415/160 |
| 6,619,916 B1 * | 9/2003 | Capozzi | ........... | F01D 5/148 415/160 |
| 6,792,758 B2 | 9/2004 | Dowman | | |
| 6,887,035 B2 * | 5/2005 | Bruce | ........... | F01D 17/162 415/160 |
| 7,104,754 B2 * | 9/2006 | Willshee | ........... | F01D 17/162 415/159 |
| 7,198,454 B2 * | 4/2007 | Evans | ........... | F01D 17/162 415/12 |
| 7,223,066 B2 * | 5/2007 | Rockley | ........... | F01D 17/162 415/160 |
| 7,299,621 B2 * | 11/2007 | Bart | ........... | F01D 17/162 60/226.1 |
| 7,588,415 B2 * | 9/2009 | Giaimo | ........... | F01D 11/001 415/160 |
| 7,665,959 B2 * | 2/2010 | Giaimo | ........... | F01D 17/162 415/160 |
| 7,690,889 B2 * | 4/2010 | Giaimo | ........... | F01D 17/162 415/160 |
| 7,762,766 B2 | 7/2010 | Shteyman et al. | | |
| 7,942,632 B2 * | 5/2011 | Lord | ........... | F01D 5/146 415/156 |
| 8,087,883 B2 * | 1/2012 | Bouru | ........... | F04D 29/563 415/160 |
| 8,240,983 B2 * | 8/2012 | Suljak, Jr. | ........... | F04D 29/563 415/160 |
| 8,314,505 B2 * | 11/2012 | McLoughlin | ........... | F01D 15/10 290/40 C |
| 8,459,035 B2 | 6/2013 | Smith et al. | | |
| 8,668,444 B2 * | 3/2014 | Jarrett, Jr. | ........... | F01D 17/162 415/160 |
| 8,762,766 B2 | 6/2014 | Ferguson et al. | | |
| 9,593,582 B2 | 3/2017 | Dejeu et al. | | |
| 2004/0197187 A1 | 10/2004 | Usab, Jr. et al. | | |
| 2004/0234372 A1 | 11/2004 | Shahpar | | |
| 2010/0014977 A1 | 1/2010 | Shattuck | | |
| 2010/0047068 A1 | 2/2010 | Parry et al. | | |
| 2010/0111674 A1 | 5/2010 | Sparks | | |
| 2011/0150659 A1 | 6/2011 | Micheli et al. | | |
| 2011/0192166 A1 | 8/2011 | Mulcaire | | |
| 2012/0177493 A1 | 7/2012 | Fabre | | |
| 2013/0104522 A1 | 5/2013 | Kupratis | | |
| 2015/0003993 A1 | 1/2015 | Kim et al. | | |

(56) References Cited

U.S. PATENT DOCUMENTS

| | | | |
|---|---|---|---|
| 2015/0098813 | A1 | 4/2015 | Jarrett, Jr. et al. |
| 2015/0291285 | A1* | 10/2015 | Gallet .................. F02C 6/02 415/60 |
| 2016/0333729 | A1* | 11/2016 | Miller .................. F01D 9/041 |

FOREIGN PATENT DOCUMENTS

| | | |
|---|---|---|
| CN | 101657607 A | 2/2010 |
| EP | 0385913 A1 | 9/1990 |
| EP | 0887259 A2 | 12/1998 |
| EP | 1493900 A2 | 1/2005 |
| EP | 2053204 B1 | 4/2012 |
| EP | 2532082 A2 | 12/2012 |
| EP | 2562082 A2 | 2/2013 |
| EP | 3093443 A1 | 11/2016 |
| GB | 2196390 A | 4/1988 |
| GB | 2 405 184 A | 2/2005 |
| KR | 101179277 B1 | 9/2012 |
| WO | 2004033295 A1 | 4/2004 |
| WO | 2005111413 A1 | 11/2005 |
| WO | 2011020458 A2 | 2/2011 |
| WO | 2011107320 A1 | 9/2011 |
| WO | WO-2014066503 A1 * | 5/2014 ............... F02C 6/206 |

OTHER PUBLICATIONS

U.S. Appl. No. 14/438,006, filed Apr. 23, 2015, Zatorski et al.

U.S. Appl. No. 14/437,872, filed Apr. 23, 2015, Stringfellow et al.

Non-Final Rejection towards related U.S. Appl. No. 14/437,872 dated Jun. 1, 2017.

Non-Final Rejection towards related U.S. Appl. No. 14/438,006 dated Jul. 25, 2017.

European Search Report and Opinion issued in connection with corresponding European Application No. 16192167.1 dated Feb. 9, 2017.

Theodorsen, "The Theory of Propellers", NACA (National Advisory Committee for Aeronautics), pp. 1-53, Aug. 1944.

Crigler, "Application of Theodorsen's Theory to Propeller Design", NACA (National Advisory Committee for Aeronautics), Report. 924, pp. 83-99, 1948.

Smith, "Unducted Fan Aerodynamic Design", Journal of Turbomachinery, vol. No. 109, Issue No. 3, pp. 313-324, Jul. 1, 1987.

Yamamoto et al., "Numerical Calculation of Propfan/Swirl Recovery Vane Flow Field", 28th Joint Propulsion Conference and Exhibit, Nashville, TN, pp. 1-8, Jul. 6-8, 1992.

PCT Search Report and Written Opinion issued in connection with related PCT Application No. PCT/US2013/066403 dated Feb. 25, 2014.

PCT Search Report and Written Opinion issued in connection with related PCT Application No. PCT/US2013/066383 dated Apr. 15, 2014.

PCT Search Report and Written Opinion issued in connection with related PCT Application No. PCT/US2013/066392 dated Jun. 4, 2014.

Chinese Office Action issued in connection with related CN Application No. 201380055486.2 dated Oct. 9, 2015.

Chinese Office Action issued in connection with related CN Application No. 201380055512.1 dated Jan. 12, 2016.

Canadian Office Action issued in connection with related CA Application No. 2887262 dated Mar. 11, 2016.

Unofficial Translation of Chinese Office Action issued in connection with related CN Application No. 201380055512.1 dated Nov. 3, 2016.

European Office Action issued in connection with related EP Application No. 13786820.4 dated Nov. 7, 2016.

Canadian Office Action issued in connection with related CA Application No. 2887262 dated Feb. 2, 2017.

First Office Action and Search issued in connection with corresponding CN Application No. 201610868436.1 dated Jun. 28, 2018.

Breeze-Stringhellow, Propeller aerodynamic loading distribution, GE co-pending U.S. Appl. No. 61/717,451, filed Oct. 23, 2012.

Breeze-Stringhellow, Vane assembly for a propulsion system, GE co-pending U.S. Appl. No. 61/771,314, filed Mar. 1, 2013.

Zatorski, Propulsion system architecture, GE co-pending U.S. Appl. No. 61/717,445, filed Oct. 23, 2012.

* cited by examiner ated to refer
ENGINE HAVING VARIABLE PITCH OUTLET GUIDE VANES

FIELD OF THE INVENTION

The present subject matter relates generally to an aircraft propulsion device, or more particularly to an aircraft propulsion device having variable pitch guide vanes.

BACKGROUND OF THE INVENTION

A gas turbine engine generally includes a core having, in serial flow order, a compressor section, a combustion section, a turbine section, and an exhaust section. During operation, an engine airflow is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the combustion section drives the compressor section and is then routed through the exhaust section, e.g., to atmosphere.

In particular configurations, the gas turbine engine additionally includes a fan mechanically coupled to the core and a plurality of outlet guide vanes. For example, the fan of such a gas turbine engine typically includes a plurality of rotatable blades driven by a shaft of the core. Rotation of the plurality of blades generates thrust for the gas turbine engine. Additionally, the plurality outlet guide vanes can direct an airflow from the blades to, e.g., reduce an amount of noise generated by the gas turbine engine and enhance a performance of the gas turbine engine.

In certain configurations, the gas turbine engine may define an outer nacelle enclosing the plurality of fan blades of the fan and the plurality of outlet guide vanes. Such a configuration allows for the outlet guide vanes to be rotated about respective pitch axes at radially outer ends where the outlet guide vanes attach to the outer nacelle.

However, certain gas turbine engines may not include the outer nacelle enclosing the plurality of fan blades and the plurality of outlet guide vanes. Accordingly, known means for actuating the outlet guide vanes may not be included with such gas turbine engines. Therefore, a gas turbine engine capable of actuating a plurality of outlet guide vanes without requiring an outer nacelle enclosing the plurality of outlet guide vanes would be useful.

BRIEF DESCRIPTION OF THE INVENTION

Aspects and advantages of the invention will be set forth in part in the following description, or may be obvious from the description, or may be learned through practice of the invention.

In one exemplary embodiment of the present disclosure, an aeronautical propulsion device defining a radial direction is provided. The propulsion device includes a fan having a plurality of fan blades for providing a flow of air in a flowpath, as well as a plurality of variable guide vanes for directing air to or from the fan in a desired direction. The plurality of guide vanes each define an inner end and an outer end along the radial direction. The plurality of guide vanes are each attached to a housing of the propulsion device at the inner end in a rotatable manner the aeronautical propulsion device additionally includes a pitch change mechanism positioned within the housing of the propulsion device and mechanically coupled to at least one of the plurality of guide vanes for changing a pitch of the at least one of the plurality of guide vanes.

In another exemplary embodiment of the present disclosure, a gas turbine engine defining a radial direction is provided. The gas turbine engine includes a fan including a plurality of fan blades for providing a flow of air in a flowpath, and a plurality of variable outlet guide vanes for directing air from the plurality of fan blades of the fan in a desired direction. The plurality of variable outlet guide vanes each define an inner end and an outer end along the radial direction. The plurality of variable outlet guide vanes are each attached to a core of the gas turbine engine at the inner end in a rotatable manner. The gas turbine engine additionally includes a pitch change mechanism positioned within the core of the gas turbine engine and mechanically coupled to at least one of the plurality of variable outlet guide vanes for changing a pitch of the at least one of the plurality of variable outlet guide vanes.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
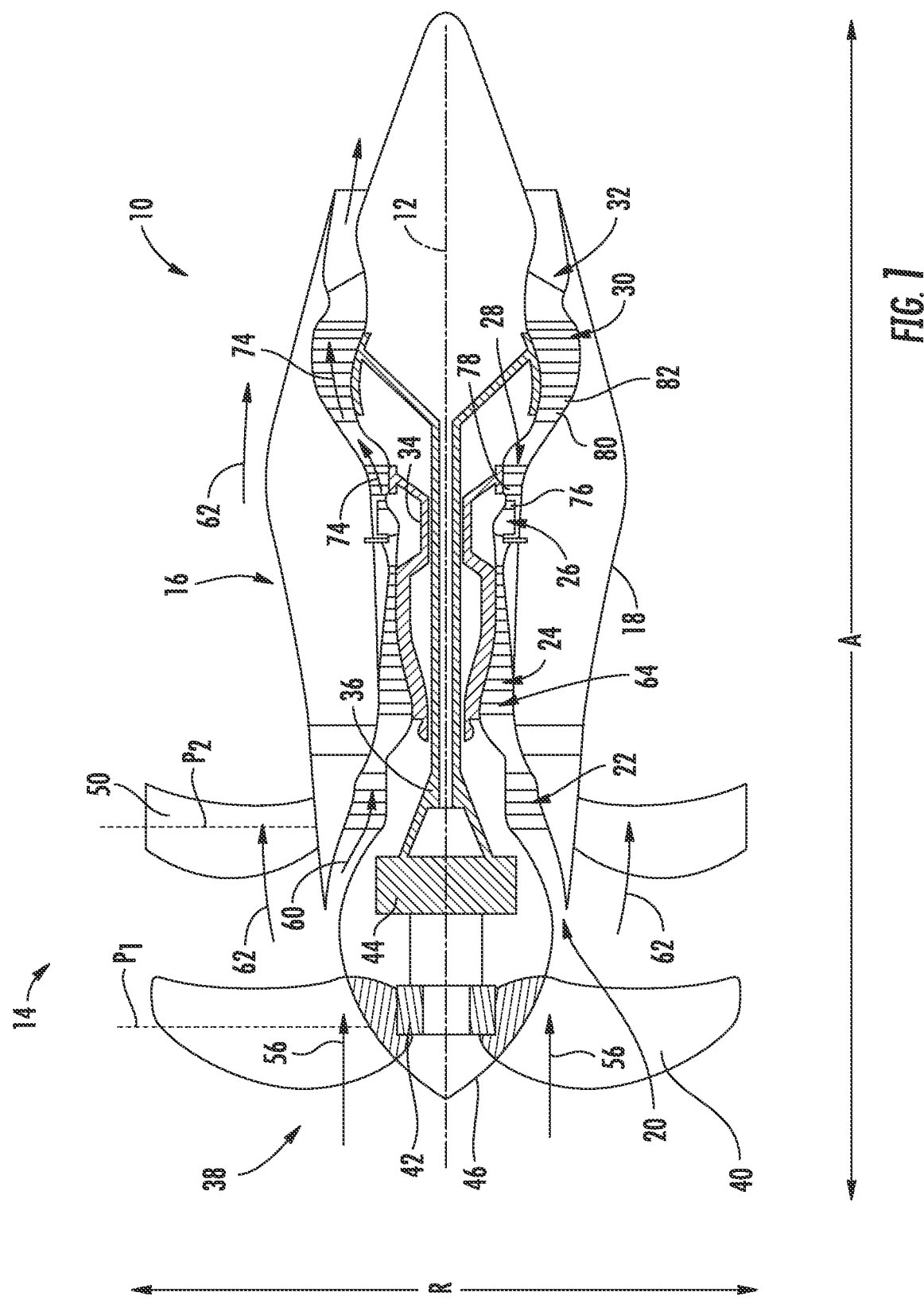
FIG. 1 is a schematic, cross-sectional view of a gas turbine engine according to an exemplary embodiment of the present subject matter.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, wherein identical numerals indicate the same elements throughout the figures, FIG.

1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. The turbofan engine 10 also defines a circumferential direction (not depicted). In general, the turbofan 10 includes a fan section 14 and a core engine 16, the fan section 14 configured in mechanical communication and positioned in flow communication with the core engine 16.

The exemplary core engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

Additionally, for the embodiment depicted, the fan section 14 includes a variable pitch fan 38 having a plurality of fan blades 40 coupled to a disk 42 in a spaced apart manner. As depicted, the fan blades 40 extend outwardly from the disk 42 generally along the radial direction R. The fan blades 40 and disk 42 are together rotatable about the longitudinal centerline 12 by LP shaft 36 across a power gear box 44. The power gear box 44 includes a plurality of gears for adjusting the rotational speed of the LP shaft 36. Additionally, the plurality of fan blades 40 are rotatable about respective pitch axes $P_1$ by an actuation device (not shown). Moreover, for the embodiment depicted, the disk 42 of the variable pitch fan 38 is covered by a rotatable front hub 46 aerodynamically contoured to promote an airflow through the plurality of fan blades 40.

Referring still to the exemplary turbofan engine 10 of FIG. 1, the exemplary turbofan engine 10 additionally includes a plurality of circumferentially-spaced outlet guide vanes 50. The plurality of outlet guide vanes 50 are positioned downstream from the fan 38 along the axial direction A and extend outwardly from the outer casing 18 of the core engine 16 generally along the radial direction R. Notably, for the embodiment depicted, the outlet guide vanes 50 are each rotatable about respective pitch axes $P_2$ by one or more actuation devices (not shown), such that the outlet guide vanes 50 may be referred to as a variable outlet guide vanes. Additionally, the exemplary turbofan engine 10 does not include any outer casing enclosing the fan section 14 and/or outlet guide vanes 50. Accordingly, for the embodiment depicted, the turbofan engine 10 may be referred to as an un-ducted, single fan turbofan engine.

For the exemplary turbofan engine 10 depicted, the fan section 14, or more particularly, the rotation of the fan blades 40 of the fan section 14, provides a majority of the propulsive thrust of the turbofan engine 10. Additionally, the plurality of outlet guide vanes 50 are provided to increase an efficiency of the fan section 14 as well as to provide other benefits, such as, for example, decreasing an amount of noise generated by the turbofan engine 10, by directing a flow of air from the plurality of fan blades 40 of the fan section 14.

During operation of the turbofan engine 10, a volume of air 56 passes over the plurality of blades 40 of the fan section 14. A first portion of the volume of air 56, i.e., the first portion of air 60, is directed or routed into an engine air flowpath 64 extending through the compressor section, the combustion section 26, the turbine section, and the exhaust section 32. Additionally, a second portion of the volume of air 56, i.e. a second portion of air 62, flows around the core engine 16, bypassing the core engine 16 (i.e., in a bypass air flowpath). The ratio between the second portion of air 62 and the first portion of air 60 is commonly known as a bypass ratio.

Referring still to FIG. 1, the pressure of the first portion of air 60 is increased as it is routed through the LP compressor 22 and subsequently through the HP compressor 24. The compressed first portion of air 60 is then provided to the combustion section 26, where it is mixed with fuel and burned to provide combustion gases 74. The combustion gases 74 are routed through the HP turbine 28 where a portion of thermal and/or kinetic energy from the combustion gases 74 is extracted via sequential stages of HP turbine stator vanes 76 that are coupled to the outer casing 18 and HP turbine rotor blades 78 that are coupled to the HP shaft or spool 34, thus causing the HP shaft or spool 34 to rotate, thereby supporting operation of the HP compressor 24. The combustion gases 74 are then routed through the LP turbine 30 where a second portion of thermal and kinetic energy is extracted from the combustion gases 74 via sequential stages of LP turbine stator vanes 80 that are coupled to the outer casing 18 and LP turbine rotor blades 82 that are coupled to the LP shaft or spool 36, thus causing the LP shaft or spool 36 to rotate, thereby supporting operation of the LP compressor 22 and/or rotation of the fan 38. The combustion gases 74 are subsequently routed through the jet exhaust nozzle section 32 of the core engine 16 to provide propulsive thrust to supplement propulsive thrust provided by the fan section 14.

Figure 2:
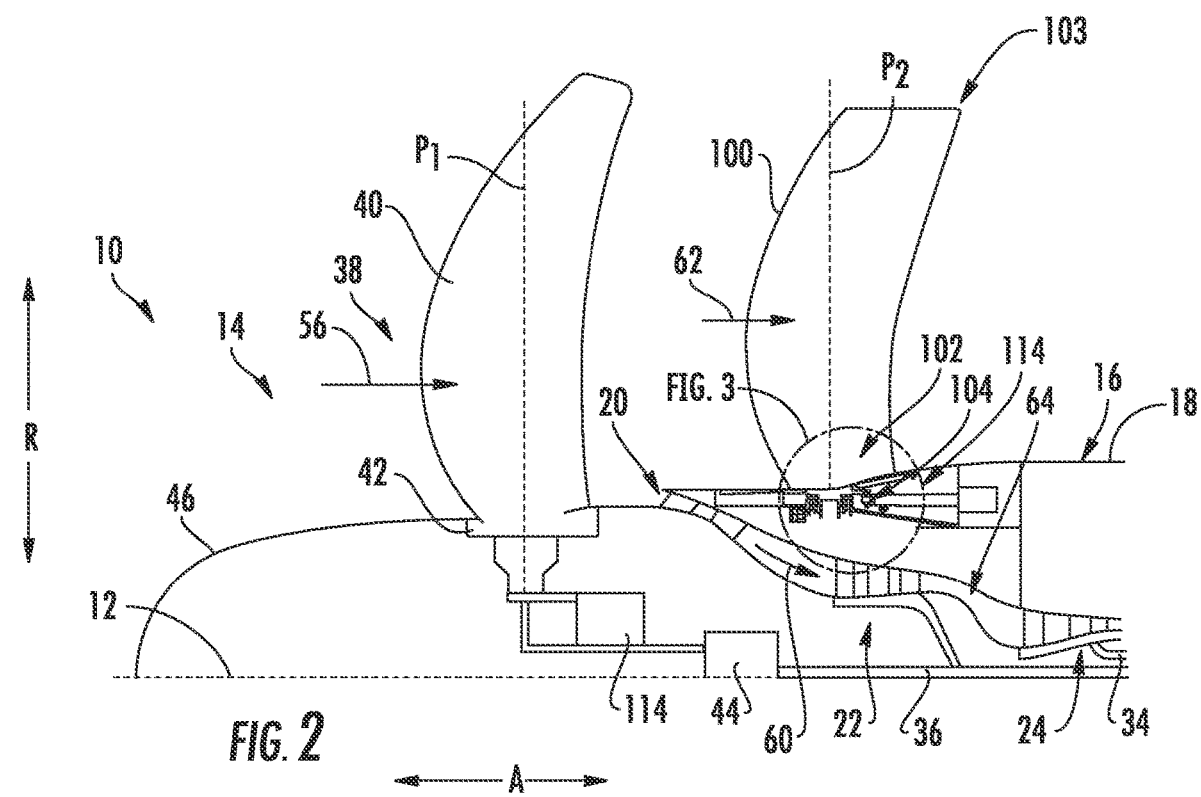
FIG. 2 is schematic, cross-sectional view of a forward end of a gas turbine engine in accordance with another exemplary embodiment of the present subject matter.

Referring now to FIG. 2, a close-up, schematic, cross-sectional view of a forward end of a gas turbine engine in accordance with an exemplary embodiment of the present disclosure is provided. In certain exemplary embodiments, the gas turbine engine of FIG. 2 may be configured as a turbofan engine 10 substantially the same as the turbofan engine 10 of FIG. 1. Accordingly, the same or similar numbering may refer to the same or similar parts.

As with the exemplary embodiment of FIG. 1, the exemplary turbofan engine 10 of FIG. 2 is configured as an un-ducted turbofan engine. As shown, the turbofan engine 10 includes a core engine 16 and a fan section 14, the fan section 14 including a fan 38 having a plurality of fan blades 40 for providing a flow of air. For the embodiment depicted, the fan 38 is configured as a variable pitch fan, such that each of the plurality of fan blades 40 are rotatable about respective pitch axes $P_1$ by a pitch change mechanism 90. Additionally, the fan 38 is rotatable about the longitudinal centerline 12 by an LP shaft 36 of the turbofan engine 10, across a gearbox 44.

As with the embodiment discussed above, a first portion of the flow of air 60 provided by the fan 38 flows into an engine air flowpath 64 within the core engine 16, wherein such air 60 may be progressively compressed by an LP compressor 22 and subsequent by an HP compressor 24. A second portion of the flow of air 62 provided by the fan 38 bypasses the core engine 16 and is provided to a bypass air flowpath.

The turbofan engine 10 additionally includes a plurality of variable guide vanes 100 for directing air to or from the fan 38 in a desired direction. Specifically, for the embodiment depicted, the plurality of variable guide vanes 100 are configured as a plurality of variable outlet guide vanes extending generally between a radially inner end 102 and a radially outer end 103 along the radial direction R. As is depicted, the plurality of guide vanes 100 are positioned aft of the plurality of fan blades 40 of the fan 38, such that the plurality of guide vanes 100 are configured for directing a flow of bypass air 62 for the turbofan engine 10.

Figure 3:
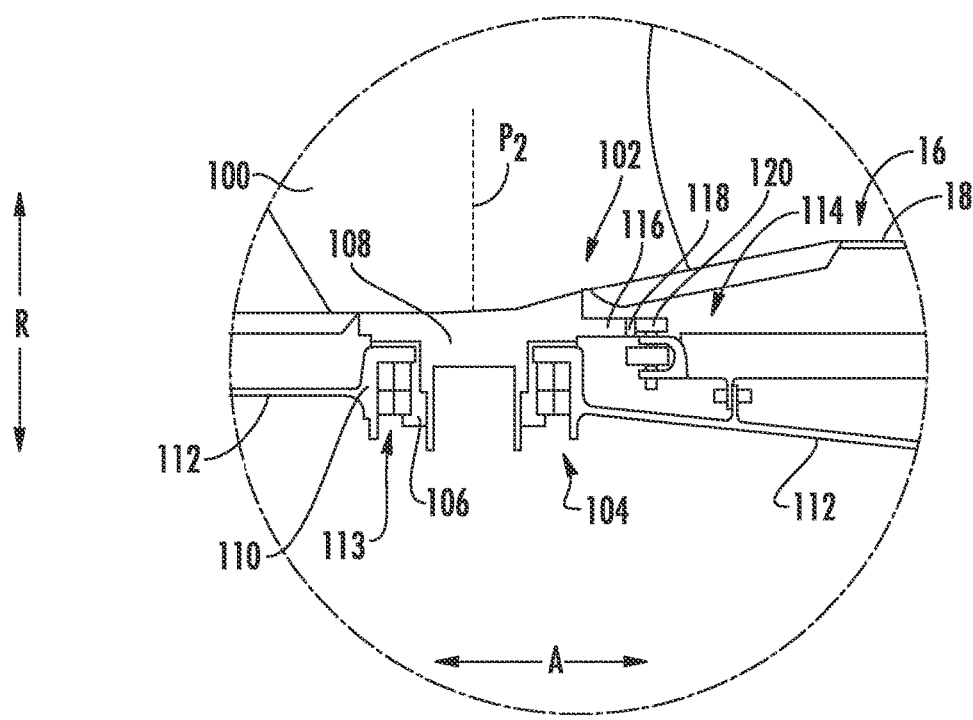
FIG. 3 is a close-up, cross-sectional view of an attachment mechanism attaching a variable guide vane of the exemplary gas turbine engine of FIG. 2 to a core of the exemplary gas turbine engine of FIG. 2.

Referring now also to FIG. 3, a close-up, schematic view of a radially inner end 102 of an exemplary variable guide vane 100 is provided. The variable guide vane 100 is attached to a housing of the turbofan engine 10 at the radially inner end 102 in a rotatable manner. More particularly, the variable guide vanes 100 is attached to the core engine 16 of the turbofan engine 10 at the radially inner end 102 in a rotatable manner.

In order to attach the variable guide vane 100 to the core engine 16 in a rotatable manner, the turbofan engine 10 additionally includes an attachment mechanism 104 for attaching one or more of the variable outlet guide vanes 100 to the core engine 16. For the embodiment depicted, the attachment mechanism 104 includes an inner race 106 attached to a base 108 of the variable guide vane 100 and an outer race 110 attached to a frame member 112 of the core engine 16. Additionally, a plurality of bearing members 113 are provided between the inner and outer races 106, 110 of the attachment mechanism 104 to allow for rotation of the variable guide vane 100 about respective a pitch axis $P_2$ of the variable guide vane 100. The bearing members 113 may be configured as any suitable bearing or combination of bearings. For example, the bearing members 113 may include one or more cylindrical roller bearings, tapered roller bearings, ball bearings, etc. Additionally, it should be appreciated that although a single guide vane 100 and attachment mechanism 104 is depicted in FIGS. 2 and 3, in certain embodiments, each of the plurality of guide vanes 100 may be attached in a rotatable manner to the core engine 16 using a corresponding plurality of attachment mechanisms 104. It should also be appreciated, however, that the attachment mechanism 104 is provided by way of example only, and that in other exemplary embodiments, any other suitable attachment mechanisms 104 may be provided.

Referring still to FIGS. 2 and 3, the turbofan engine 10 additionally includes a pitch change mechanism 114 positioned within the housing (i.e., positioned within the core engine 16) of the turbofan engine 10 and mechanically coupled to at least one of the plurality of variable guide vanes 100 for changing a pitch of the at least one of the plurality of variable outlet guide vanes 100. For the embodiment depicted, the pitch change mechanism 114 is further mechanically coupled to each of the plurality of guide vanes 100 for changing a pitch of each of the plurality of guide vanes 100, e.g., in unison. Specifically, for the embodiment depicted, the base 108 of each variable guide vane 100 includes an extension arm 116 and the pitch change mechanism 114 includes a rack and pinion gear system. For example, a rack/ring gear 118 may be attached to each extension arm 116 of the plurality of variable guide vanes 100. The pitch change mechanism 114 may also include one or more pinion gears 120 meshing with the rack/ring gear 118 for moving the rack/ring gear 118 about a circumferential direction of the turbofan engine 10, rotating the base 108 of each of the plurality of variable guide vanes 100, which in turn rotates each of the plurality of variable guide vanes 100 about their respective pitch axes $P_2$.

It should be appreciated, however, that the exemplary turbofan engine 10 described with reference to FIGS. 2 and 3, including the pitch change mechanism 114, is provided by way of example only. In other exemplary embodiments, for example, any other suitable pitch change mechanism 114 may be provided. For example, in other exemplary embodiments, the pitch change mechanism 114 may be configured for changing a pitch $P_2$ of one or more of the guide vanes 100 relative to the remaining guide vanes 100. More specifically, in certain exemplary embodiments, the pitch change mechanism 114 may not be configured for changing a pitch $P_2$ of the plurality of guide vanes 100 in unison. For example, in other exemplary embodiments, the pitch change mechanism 114 may be configured as one or more swash plates.

Moreover, in still other exemplary embodiments, any other suitable gas turbine engine may be provided, and furthermore, aspects of the present disclosure may be utilized with any other suitable aeronautical propulsion device. For example, referring now to FIG. 4, a close-up, cross-sectional view is provided of an aft engine 150 in accordance with an exemplary aspect of the present disclosure. Specifically, FIG. 4 depicts an exemplary aft engine 150 installed at a tale end of an aircraft 152.

Figure 4:
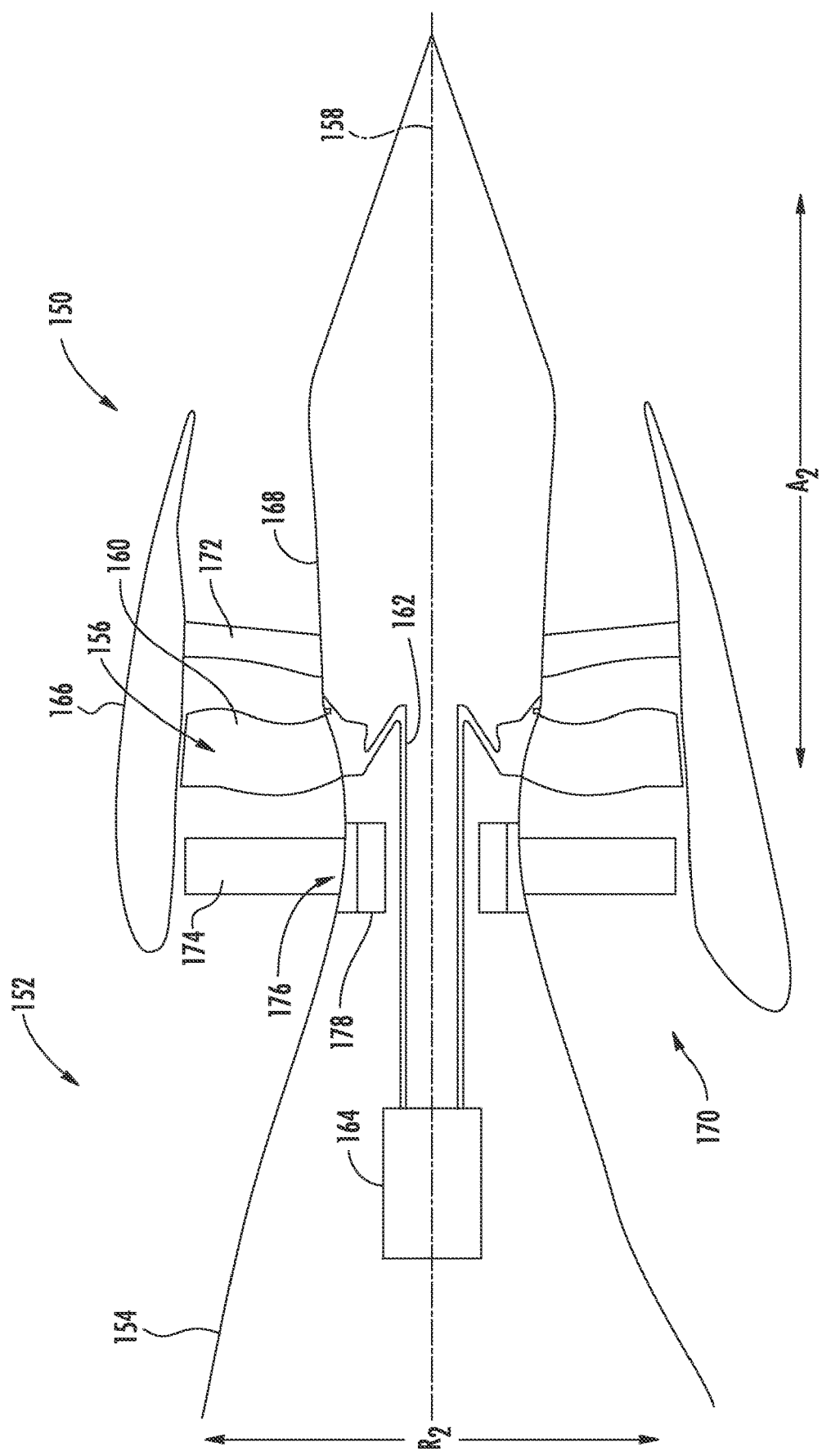
FIG. 4 is a cross-sectional view of an aft engine in accordance with an exemplary embodiment of the present disclosure.

Additionally, for the embodiment of FIG. 4, the aft engine 150 is configured as a boundary layer ingestion fan, or more particularly, a fan configured to ingest a boundary layer flow of air around a fuselage 154 of the aircraft 152 to which it is mounted. The exemplary aft engine 150 depicted generally includes a fan 156 rotatable about a centerline axis 158 of the aft engine 150. The fan 156 generally includes a plurality of fan blades 160 attached at an inner end along a radial direction $R_2$ to a fan shaft 162 of the fan 156. The fan shaft 162 extends generally along an axial direction $A_2$ of the aft engine 150 and is mechanically coupled to a power source 164. The power source 164 may be an electrical power source, e.g., such as an electric engine, or alternatively may be any other suitable power source. For example, in other embodiments, the power source 164 may include an internal combustion engine or turbomachinery components positioned at any suitable location.

The plurality of fan blades 160 of the fan 156 are encircled by a nacelle 166. The nacelle 166 extends, for the embodiment depicted, substantially 360 degrees around a housing or core 168 of the aft engine 150, as well as of a portion of the fuselage 154 of the aircraft 152. Accordingly, the nacelle 166 defines an inlet 170 at a forward end with the fuselage 154 of the aircraft 152, the inlet 170 extending substantially 360 degrees around the fuselage 154 of the aircraft 152. For the embodiment depicted, the nacelle 166 is supported by a plurality of structural members 172 located aft of the plurality of fan blades 160. The plurality of structural members 172 may be configured as outlet guide vanes.

Moreover, the aft engine 150 includes a plurality of variable guide vanes 174 for directing air to the plurality of fan blades 160 in a desired direction. The plurality of variable guide vanes 174 are positioned forward of the plurality of fan blades 160 and are configured as variable inlet guide vanes. Moreover, as is depicted, each of the plurality of variable guide vanes 174 are attached to the core 168 of the aft engine 150/fuselage 154 of the aircraft 152 at a respective radially inner end 176 in a rotatable manner. Accordingly, each of the plurality of variable guide vanes 174 are attached in a cantilevered manner to the core 168 of the aft engine 150/fuselage 154 of the aircraft 152. The aft engine 150 additionally includes a pitch change mechanism 178 mechanically coupled to each of the plurality of variable guide vanes 174 for changing a pitch $P_2$ of the plurality of variable guide vanes 174, e.g., in unison.

It should be appreciated, however, that the exemplary aft engine 150 depicted in FIG. 4 is provided by way of example only, and that in other exemplary embodiments, any other suitable aft engine 150 may be provided. For example, in other exemplary embodiments, the structural members 172 supporting the nacelle 166 may instead be positioned forward of the plurality of fan blades 160, and/or the variable guide vanes 174 may be positioned aft of the plurality of fan blades 160. Additionally, or alternatively, the aft engine 150 may not include the nacelle 166.

An aeronautical propulsion device including aspects of the present disclosure may allow for the variable guide vane to be attached in a cantilevered manner at a radially inner end to a housing or core of the propulsion device in a rotatable manner. Inclusion of such a variable guide vane may allow for an increased efficiency of the propulsion device, as well as providing various other benefits, without requiring the propulsion device to include, e.g., a nacelle or other outer casing member such that the variable guide vanes may be attached at a radially outer ends thereto and controlled therefrom.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aeronautical propulsion device defining a radial direction, the propulsion device comprising:
   a fan including a plurality of fan blades for providing a flow of air in an engine air flowpath;
   a plurality of variable guide vanes for directing air to or from the fan in a desired direction, each variable guide vane of the plurality of variable guide vanes defining an inner end along the radial direction, the inner end comprising a base, and an outer end along the radial direction, and each variable guide vane attached at the inner end in a rotatable manner to a housing of the propulsion device; and
   a pitch change mechanism positioned radially between the engine air flowpath and the plurality of variable guide vanes and mechanically coupled to at least one variable guide vane of the plurality of variable guide vanes for changing a pitch of the at least one variable guide vane;
   wherein the at least one variable guide vane includes an extension arm extending axially outward directly from a side of the base of the at least one variable guide vane, and the pitch change mechanism is positioned aft of the base of the at least one variable guide vane in an axial direction and aligned with the base of the at least one variable guide vane in the radial direction, the pitch change mechanism attached to the extension arm.

2. The aeronautical propulsion device of claim 1, wherein the plurality of variable guide vanes are configured as inlet guide vanes.

3. The aeronautical propulsion device of claim 1, wherein the plurality of variable guide vanes are configured as outlet guide vanes.

4. The aeronautical propulsion device of claim 1, wherein the aeronautical propulsion device is an un-ducted turbofan engine.

5. The aeronautical propulsion device of claim 1, wherein the aeronautical propulsion device is a turbofan engine, and wherein the plurality of variable guide vanes are configured for directing a flow of bypass air of the turbofan engine.

6. The aeronautical propulsion device of claim 1, wherein the aeronautical propulsion device is an aft engine.

7. The aeronautical propulsion device of claim 1, wherein the plurality of variable guide vanes are attached to the housing of the propulsion device using a plurality of attachment devices.

8. The aeronautical propulsion device of claim 7, wherein each attachment device of the plurality of attachment devices includes an inner race attached to a base of each variable guide vane of the plurality of variable guide vanes and an outer race attached to a frame member of the propulsion device, and wherein each attachment device additionally includes one or more bearing members positioned between the inner race and the outer race.

9. A gas turbine engine defining a radial direction, the gas turbine engine comprising:
   a core comprising a compressor and a turbine, and the core defining an annular inlet;
   a fan located upstream of the annular inlet of the core, the fan comprising a plurality of fan blades;
   a plurality of variable outlet guide vanes for directing air from the plurality of fan blades in a desired direction, each variable outlet guide vane of the plurality of variable outlet guide vanes defining an inner end along the radial direction, the inner end comprising a base, and an outer end along the radial direction, and each variable outlet guide vane attached at the inner end in a rotatable manner to the core of the gas turbine engine; and
   a pitch change mechanism positioned within the core of the gas turbine engine and mechanically coupled to the inner end of at least one variable outlet guide vane of the plurality of variable outlet guide vanes for changing a pitch of the at least one variable outlet guide vane;
   wherein the at least one variable outlet guide vane includes an extension arm extending axially outward directly from a side of the base of the at least one variable outlet guide vane, and the pitch change mechanism is positioned aft of the base of the at least one variable guide vane in an axial direction and aligned with the base of the at least one variable guide vane in the radial direction, the pitch change mechanism attached to the extension arm.

10. The gas turbine engine of claim 9, wherein the gas turbine engine is an un-ducted turbofan engine.

11. The gas turbine engine of claim 9, wherein the plurality of variable outlet guide vanes are positioned aft of the plurality of fan blades of the fan.

12. The gas turbine engine of claim 9, wherein the plurality of variable outlet guide vanes are configured for directing a flow of bypass air of a turbofan engine.

13. The gas turbine engine of claim 9, wherein the pitch change mechanism is further mechanically coupled to each variable outlet guide vane.

14. The gas turbine engine of claim 9, wherein the pitch change mechanism includes a rack and pinion gear system.

15. The gas turbine engine of claim 9, wherein the plurality of variable outlet guide vanes are attached to the core of the gas turbine engine using a plurality of attachment devices.

16. The gas turbine engine of claim 15, wherein each attachment device of the plurality of attachment devices includes an inner race attached to a base of each variable outlet guide vane of the plurality of variable outlet guide vanes and an outer race attached to a frame member of a propulsion device, and wherein each attachment device additionally includes one or more bearing members positioned between the inner race and the outer race.

17. The aeronautical propulsion device of claim 1, further comprising an outer nacelle surrounding the fan and defining at least in part the flowpath, wherein the outer end of each variable guide vane of the plurality of variable guide vanes is separated from the outer nacelle.

18. A boundary layer ingestion fan for an aircraft defining a radial direction, the boundary layer ingestion fan configured to be mounted at an aft end of the aircraft and comprises:
 the boundary layer ingestion fan including a plurality of fan blades for providing a flow of air in a flowpath outboard of a fuselage of the aircraft in the radial direction;
 a plurality of variable guide vanes for directing air to or from the fan in a desired direction, each variable guide vane of the plurality of variable guide vanes defining an inner end along the radial direction, the inner end comprising a base, and an outer end along the radial direction, each variable guide vane attached at the inner end in a rotatable manner to a housing of the boundary layer ingestion fan; and
 a pitch change mechanism positioned within the fuselage of the aircraft and mechanically coupled to each variable guide vane for changing a pitch of each variable guide vane;
 wherein each variable guide vane includes an extension arm extending axially outward directly from a side of the base of the variable guide vane, and the pitch change mechanism is positioned aft of the base of the variable guide vane in an axial direction and aligned with the base of the variable guide vane in the radial direction, the pitch change mechanism attached to the extension arm.

19. The boundary layer ingestion fan of claim 18, further comprising an outer nacelle surrounding the fan and defining at least in part the flowpath, wherein the outer end of each variable guide vane is separated from the outer nacelle.

20. The aeronautical propulsion device of claim 1, wherein the pitch change mechanism is configured for changing a pitch of one or more variable guide vanes of the plurality of variable guide vanes relative to one or more remaining variable guide vanes of the plurality of variable guide vanes.

21. An un-ducted turbofan engine defining a radial direction and an axial direction, the unducted turbofan engine comprising:
 a core engine defining an engine air flowpath, the core engine having an outer casing defining an inlet to the engine air flowpath that is annular about the axial direction;
 a fan located upstream of the inlet, the fan comprising a plurality of un-ducted fan blades;
 a plurality of variable outlet guide vanes for directing air from the plurality of un-ducted fan blades in a desired direction, each variable outlet guide vane of the plurality of variable outlet guide vanes defining an inner end along the radial direction, the inner end comprising a base, and an outer end along the radial direction, each variable outlet guide vane attached at the inner end to the core engine, at least one variable outlet guide vane of the plurality of variable outlet guide vanes attached in a rotatable manner to the core engine of the un-ducted turbofan engine; and
 a pitch change mechanism positioned radially between the engine air flowpath and the plurality of variable outlet guide vanes and mechanically coupled to the at least one variable outlet guide vane of the plurality of variable outlet guide vanes for changing a pitch of the at least one variable outlet guide vane;
 wherein each variable guide vane includes an extension arm extending axially outward directly from a side of the base of the variable guide vane, and the pitch change mechanism is positioned aft of the base of the variable guide vane in an axial direction and aligned with the base of the variable guide vane in the radial direction, the pitch change mechanism attached to the extension arm.

\* \* \* \* \*